(12) United States Patent
Chang

(10) Patent No.: US 10,994,457 B2
(45) Date of Patent: May 4, 2021

(54) METHOD FOR MANUFACTURING MASSAGE WEAR-RESISTANT TREADMILL DECK AND FINISHED PRODUCT THEREOF

(71) Applicant: Chung-Fu Chang, Changhua County (TW)

(72) Inventor: Chung-Fu Chang, Changhua County (TW)

( * ) Notice: Subject to any disclaimer, the term of this patent is extended or adjusted under 35 U.S.C. 154(b) by 320 days.

(21) Appl. No.: 15/950,293

(22) Filed: Apr. 11, 2018

(65) Prior Publication Data
US 2018/0297254 A1  Oct. 18, 2018

(30) Foreign Application Priority Data

Apr. 17, 2017  (TW) .................................. 106112857

(51) Int. Cl.
*B29C 45/14* (2006.01)
*A63B 22/02* (2006.01)
(Continued)

(52) U.S. Cl.
CPC ....... *B29C 45/14344* (2013.01); *A61H 7/002* (2013.01); *A61H 11/00* (2013.01);
(Continued)

(58) Field of Classification Search
CPC ................ A63B 6/00; A63B 21/00178; A63B 21/00185; A63B 21/068; A63B 21/4027; A63B 21/4037; A63B 21/4039; A63B 22/02; A63B 22/0207; A63B 22/0285; A63B 26/00; A63B 26/003; A63B 37/12; A63B 37/14; A63B 29/06; A63B 41/08; A63B 45/00; A63B 45/02; A63B 59/45; A63B 59/48; A63B 71/0054; A63B 2071/0063; A63B 2071/0072; A63B 2209/00; B29C 45/14344; B29C 45/17; B29C 45/40; A61H 7/002; A61H 11/00;
(Continued)

(56) References Cited

U.S. PATENT DOCUMENTS

| 4,329,981 | A | * | 5/1982 | Dungl | .................... | A61H 7/001 |
| | | | | | | 601/28 |
| 5,186,703 | A | * | 2/1993 | Huang | .................... | A61H 7/001 |
| | | | | | | 482/148 |

(Continued)

*Primary Examiner* — Gary D Urbiel Goldner
(74) *Attorney, Agent, or Firm* — Karin L. Williams; Alan D. Kamrath; Mayer & Williams PC

(57) ABSTRACT

A method for manufacturing a massage wear-resistant treadmill deck and a finished product thereof are provided. The method includes step 1: providing a mold, the mold having a plurality of cavities thereon, a wear-resistant material being injected into the cavities of the mold; step 2: placing a deck in the mold so that the wear-resistant material is bonded to a surface of the deck to form a plurality of massage protrusions on the deck; and step 3: demoulding the deck from the mold, the surface of the deck being formed with the massage protrusions to form the massage wear-resistant treadmill deck. A wear-resistant layer having the massage protrusions is first formed in the mold, and then the deck is placed into the mold to bond with the wear-resistant layer to form the massage wear-resistant treadmill deck. The manufacturing cost is reduced and the manufacturing mobility is improved.

10 Claims, 6 Drawing Sheets

(51) Int. Cl.
*A61H 7/00* (2006.01)
*A61H 11/00* (2006.01)
*A63B 21/00* (2006.01)
*B29C 45/17* (2006.01)
*B29C 45/40* (2006.01)
*B29L 29/00* (2006.01)

(52) U.S. Cl.
CPC ........ *A63B 21/00178* (2013.01); *A63B 22/02* (2013.01); *A63B 22/0285* (2013.01); *B29C 45/17* (2013.01); *B29C 45/40* (2013.01); *A61H 2205/12* (2013.01); *B29K 2995/0087* (2013.01); *B29L 2029/00* (2013.01)

(58) Field of Classification Search
CPC ........ A61H 2205/12; B29K 2995/0087; B29L 2029/00
See application file for complete search history.

(56) References Cited

U.S. PATENT DOCUMENTS

| | | | | |
|---|---|---|---|---|
| 5,527,241 A * | 6/1996 | Peng | ...................... | A61H 7/001 482/51 |
| 5,690,572 A * | 11/1997 | Belz | ...................... | F16G 1/04 428/109 |
| 6,180,210 B1 * | 1/2001 | Debus | ...................... | A63B 22/02 428/167 |
| 6,663,540 B1 * | 12/2003 | Huang | ...................... | A63B 22/02 482/54 |
| 6,918,859 B1 * | 7/2005 | Yeh | ...................... | A61H 7/001 482/54 |
| 7,976,437 B1 * | 7/2011 | von Detten | ...................... | A63B 22/0235 482/54 |
| 10,470,518 B1 * | 11/2019 | Walsh | ...................... | A43B 17/02 |
| 2005/0170935 A1 * | 8/2005 | Manser | ...................... | A63B 22/02 482/54 |
| 2007/0060451 A1 * | 3/2007 | Lucas | ...................... | A61H 7/001 482/54 |
| 2007/0072743 A1 * | 3/2007 | Severino | ...................... | A63B 22/0242 482/54 |
| 2007/0298937 A1 * | 12/2007 | Shah | ...................... | A63B 22/02 482/54 |
| 2008/0176719 A1 * | 7/2008 | To | ...................... | A63B 22/0235 482/54 |
| 2010/0035731 A1 * | 2/2010 | Rohr | ...................... | A63B 22/02 482/54 |
| 2010/0101037 A1 * | 4/2010 | Gross | ...................... | B29C 37/0025 15/167.1 |
| 2010/0227740 A1 * | 9/2010 | Liu | ...................... | A61P 25/00 482/54 |
| 2010/0300850 A1 * | 12/2010 | Wang | ...................... | A63B 22/0285 198/847 |
| 2010/0304936 A1 * | 12/2010 | Wang | ...................... | A63B 22/0207 482/54 |
| 2011/0152038 A1 * | 6/2011 | Freitag | ...................... | A63B 22/0235 482/54 |
| 2013/0153123 A1 * | 6/2013 | Pasch | ...................... | B29C 43/28 156/138 |
| 2013/0281241 A1 * | 10/2013 | Watterson | ...................... | A63B 22/0285 474/268 |
| 2016/0016620 A1 * | 1/2016 | Sugihara | ...................... | B29C 43/18 305/167 |
| 2016/0075069 A1 * | 3/2016 | Deneire | ...................... | B29C 43/46 428/156 |
| 2016/0279463 A1 * | 9/2016 | Chang | ...................... | B05D 5/00 |
| 2017/0340917 A1 * | 11/2017 | Chang | ...................... | B32B 3/266 |
| 2018/0043949 A1 * | 2/2018 | Boily | ...................... | B60K 35/00 |
| 2018/0311106 A1 * | 11/2018 | Shin | ...................... | A61H 39/04 |

* cited by examiner

METHOD FOR MANUFACTURING MASSAGE WEAR-RESISTANT TREADMILL DECK AND FINISHED PRODUCT THEREOF

FIELD OF THE INVENTION

The present invention relates to sports equipment, and more particularly to a method for manufacturing a massage wear-resistant treadmill deck and a finished product. A wear-resistant layer having massage protrusions is first formed in a mold, and then a deck is placed into the mold to bond with the wear-resistant layer to form a massage wear-resistant treadmill deck having a massage effect. The manufacturing cost is reduced and the manufacturing mobility is improved.

BACKGROUND OF THE INVENTION

A conventional treadmill comprises a treadmill belt, a wear-resistant deck, and a running deck, and so on. The wear-resistant deck is made by weaving or knitting or through of a petrochemical material to form a bundle or a roll of wear-resistant belt. The aforementioned wear-resistant belt is cut in accordance with the size of the running deck to form the wear-resistant deck structure. The wear-resistant belt may have different shapes, such as a flat shape, a curved shape or having massage particles. Then, the wear-resistant deck is mounted on the running deck, and finally the treadmill belt is mounted on the wear-resistant deck. The wear-resistant deck having massage particles provides a massage effect when the user runs on the treadmill.

The existing manufacturing method has the following shortcomings:

(1) The qualification rate of the massage particles manufactured by the existing method is low. The existing wear-resistant deck having a massage function is first cut according the size of the running deck and then sent to a processing machine for pressurization, so that the wear-resistant deck is formed with a plurality of massage particles. During the manufacturing process of the above-mentioned structure, in order to form the massage particles on the surface of the wear-resistant deck by stamping, the wear-resistant deck may break because the entire wear-resistant deck is made of a wear-resistant material.

(2) Cost waste: Manufacturers need to order quite a number of wear-resistant belts. These wear-resistant belts are made of wear-resistant materials, which have a high cost and occupy a space. Hoarding the wear-resistant belts also creates problems with the manufacturers cash flow.

Accordingly, the inventor of the present invention has devoted himself based on his many years of practical experiences to solve these problems.

SUMMARY OF THE INVENTION

The primary object of the present invention is to provide a method for manufacturing a massage wear-resistant treadmill deck and a finished product thereof. Through a mold, the surface of a deck is formed with massage protrusions made of a wear-resistant material. The cavities of the mold may be different in depth and in shape in accordance with the required massage protrusions.

In order to achieve the aforesaid object, the method for manufacturing a massage wear-resistant treadmill deck of the present invention comprises the following steps:

step 1: providing a mold, the mold having a plurality of cavities thereon, a wear-resistant material being injected into the cavities of the mold;

step 2: placing a deck in the mold so that the wear-resistant material is bonded to a surface of the deck to form a plurality of massage protrusions on the deck; and step 3: demoulding the deck from the mold, the surface of the deck being formed with the massage protrusions to form the massage wear-resistant treadmill deck.

In some embodiments, after step 2, a sulfurization process is provided, so that the massage wear-resistant treadmill deck has the properties of high strength, high flexibility, high wear resistance, and corrosion resistance.

In some embodiments, after step 2, a natural cooling process is provided.

In some embodiments, the deck is formed with a plurality of perforations. The perforations correspond in position to the cavities of the mold. The wear-resistant material is injected into the cavities of the mold through the perforations to form the plurality of massage protrusions on the deck.

In some embodiments, the deck is provided with a plurality of tapered posts. The tapered posts each have a central perforation. Through the perforations of the tapered posts, the wear-resistant material is injected into the cavities of the mold to wrap the tapered posts, thereby improving the strength of the massage protrusions and reducing the use of the wear-resistant material to lower the manufacturing cost.

In some embodiments, the massage protrusions on the massage wear-resistant treadmill deck are formed with a three-dimensional pattern corresponding in shape to the cavities of the mold.

According to another aspect of the present invention, a massage wear-resistant treadmill deck is provided. The massage wear-resistant treadmill deck comprises a mold, a wear-resistant material, and a deck. The mold has a plurality of cavities at a bottom thereof. The wear-resistant material is injected into the cavities at the bottom of the mold. The deck is attached to the cavities at the bottom of the mold. Thereby, the wear-resistant material in the plurality of cavities at the bottom of the mold is bonded to the surface of the deck to form a wear-resistant layer so that the surface of the deck is formed with the massage protrusions to form the massage wear-resistant treadmill deck.

The present invention has the following advantages:

(1) Simplified method: With the manufacturing method of the present invention, it is possible to manufacture the massage wear-resistant treadmill deck at any time without mass production, having high mobility.

(2) Easy to change the pattern and specification of the massage protrusions: The massage protrusions of the present invention are formed by injection molding, so that the size of the massage protrusions can be changed at any time through a predetermined mold, that is, the massage protrusions of the massage wear-resistant treadmill deck may have different specifications and patterns.

(3) Cost savings: The wear-resistant material is selected from better materials, and the wear-resistant material is only injected into the cavities of the mold. Compared to the conventional treadmill deck made of the best raw material, the present invention can save the cost.

DETAILED DESCRIPTION OF THE PREFERRED EMBODIMENTS

Figure 1:
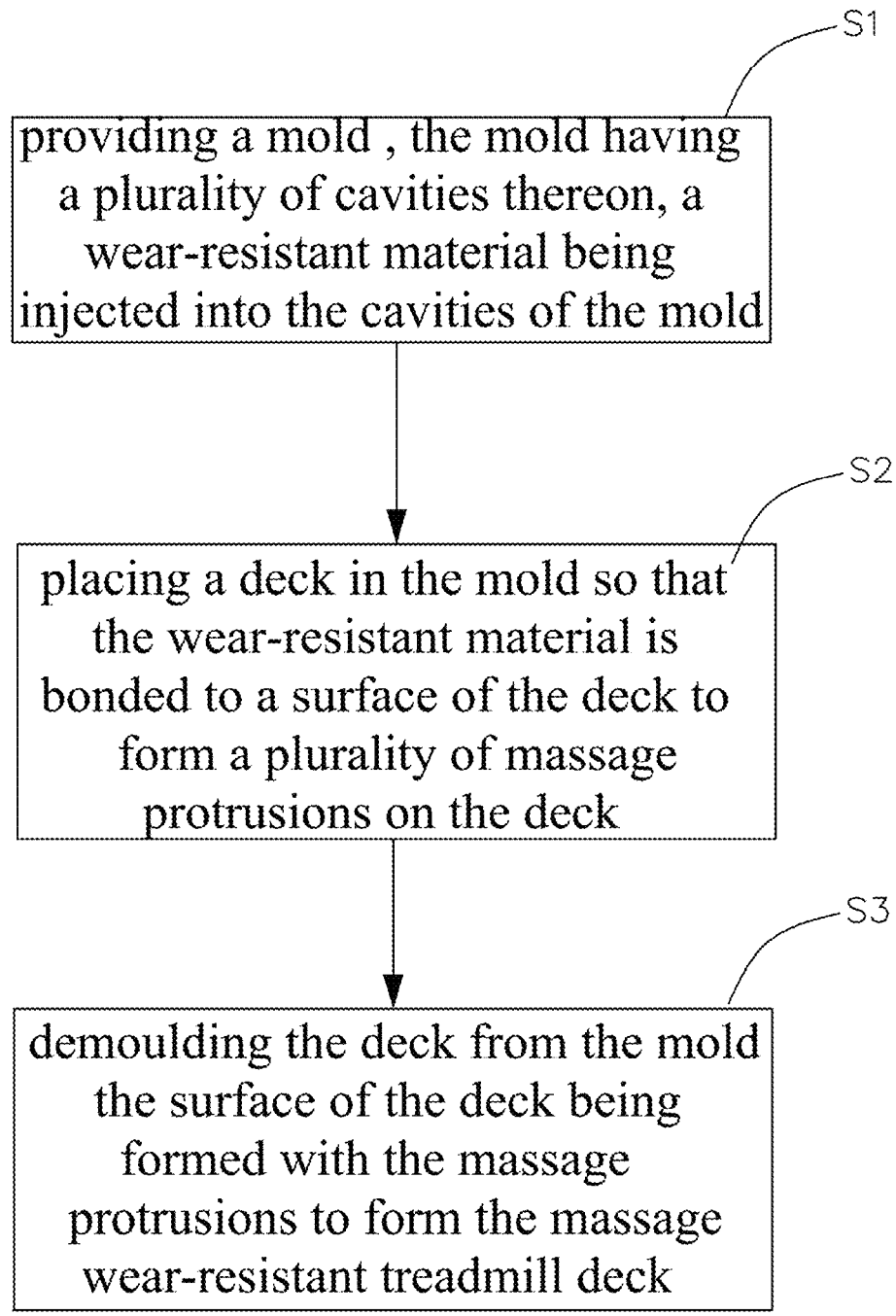
FIG. 1 is a block diagram of the manufacturing method of the present invention.
Figure 2:
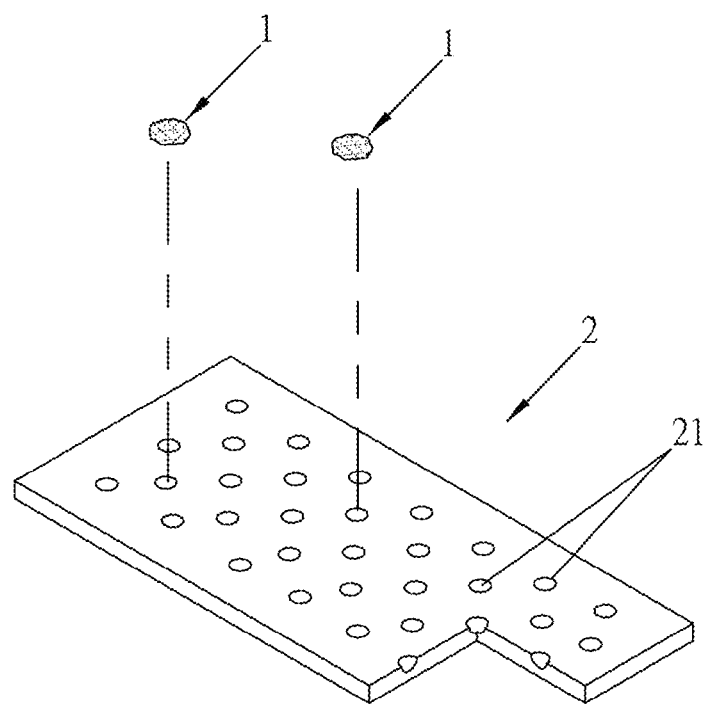
FIG. 2 is a schematic view showing the embodiment of the step 1 of the present invention.
Figure 3:
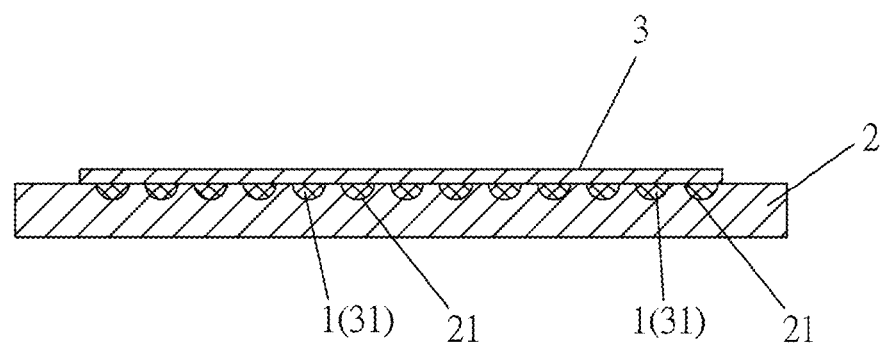
FIG. 3 is a schematic view showing the embodiment of the step 2 of the present invention.
Figure 4:
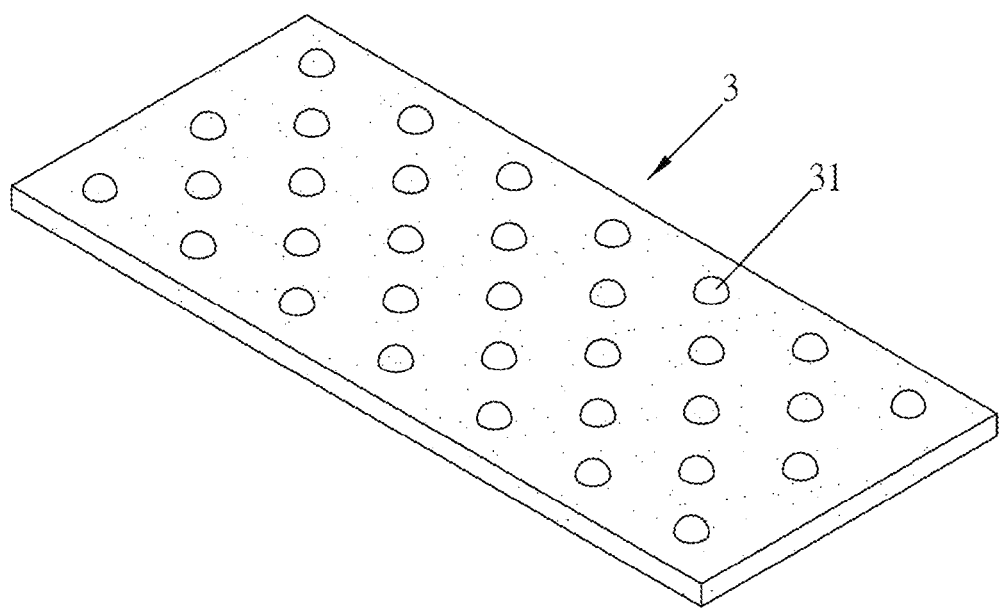
FIG. 4 is a schematic view showing the embodiment of the step 3 of the present invention.

Embodiments of the present invention will now be described, by way of example only, with reference to the accompanying drawings.

As shown FIG. 1 to FIG. 4, a method for manufacturing a massage wear-resistant treadmill deck of the present invention comprises the following steps:

Step 1 S1: providing a mold 2, the mold 2 having a plurality of cavities 21 thereon, a wear-resistant material 1 being injected into the cavities 21 of the mold 2;

Step 2 S2: placing a deck 3 in the mold 2 so that the wear-resistant material 1 is bonded to a surface of the deck 3 to form a plurality of massage protrusions 31 on the deck 3; and Step 3 S3: demoulding the deck 3 from the mold 2, the surface of the deck 3 being formed with the massage protrusions 31 to form the massage wear-resistant treadmill deck.

The deck 3 manufactured by the above-described manufacturing method is provided with the plurality of massage protrusions 31 which can be used to massage the sole. The massage protrusions 31 formed by the cavities 21 of the mold 2 are directly bonded to the deck 3, thereby reducing the costs and improving the mobility of manufacturing.

In some embodiments, after step S2, a sulfurization process is provided. Since the wear-resistant treadmill deck is made of a petrochemical raw material, it has the properties of a rubber material and the like. After step 2, the deck 3 and the massage protrusions 31 are sulfurized so that the massage wear-resistant treadmill deck has the properties of high strength, high flexibility, high wear resistance, and corrosion resistance.

In some embodiments, after step a natural cooling process is provided.

Figure 5:
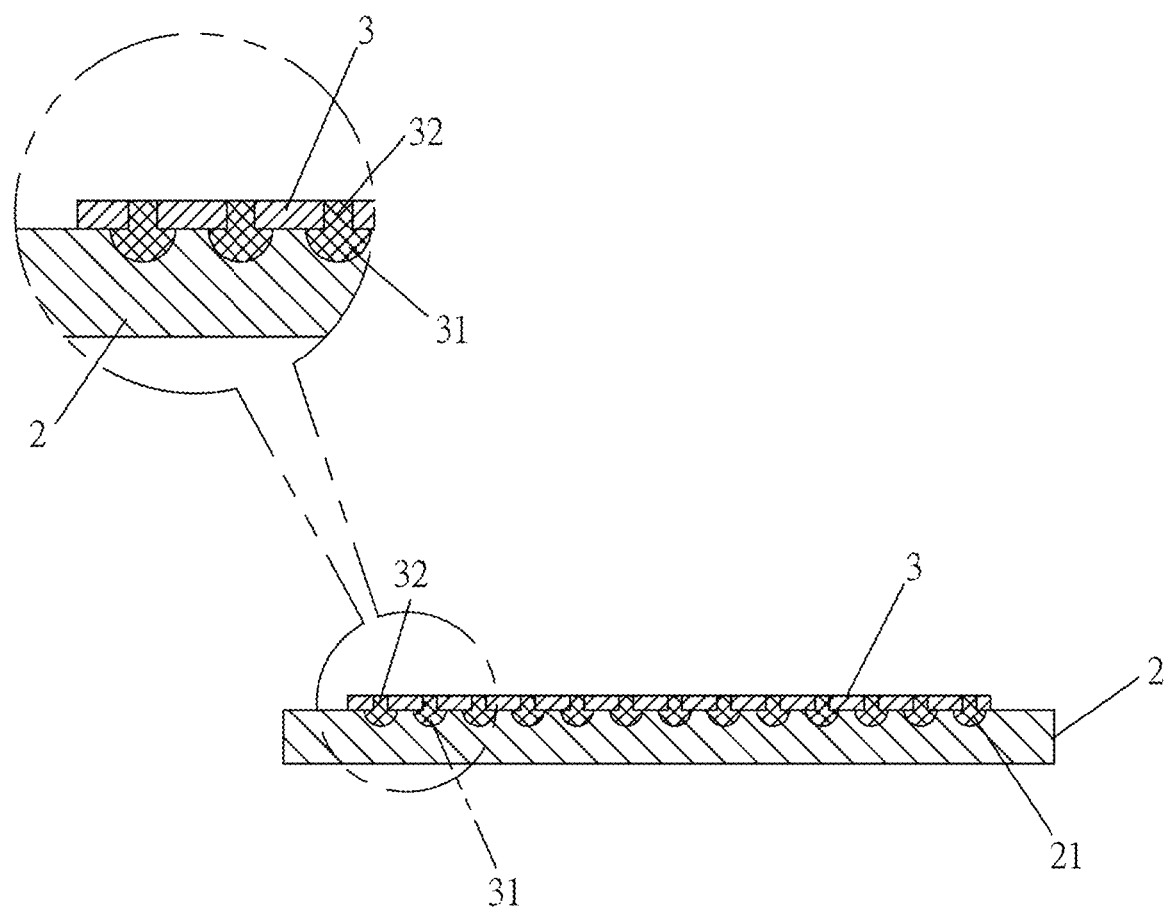
FIG. 5 is a schematic view showing the deck provided with the perforations.

Referring to FIG. 5, the present invention provides a means for forming the massage protrusions on the deck. The deck 3 is formed with a plurality of perforations 32. The perforations 32 correspond in position to the cavities 21 of the mold 2. When the deck 3 is placed into the mold 2, the wear-resistant material 1 is injected into the cavities 21 through the perforations 32 to form the plurality of massage protrusions 31 on the deck 3.

Figure 6:
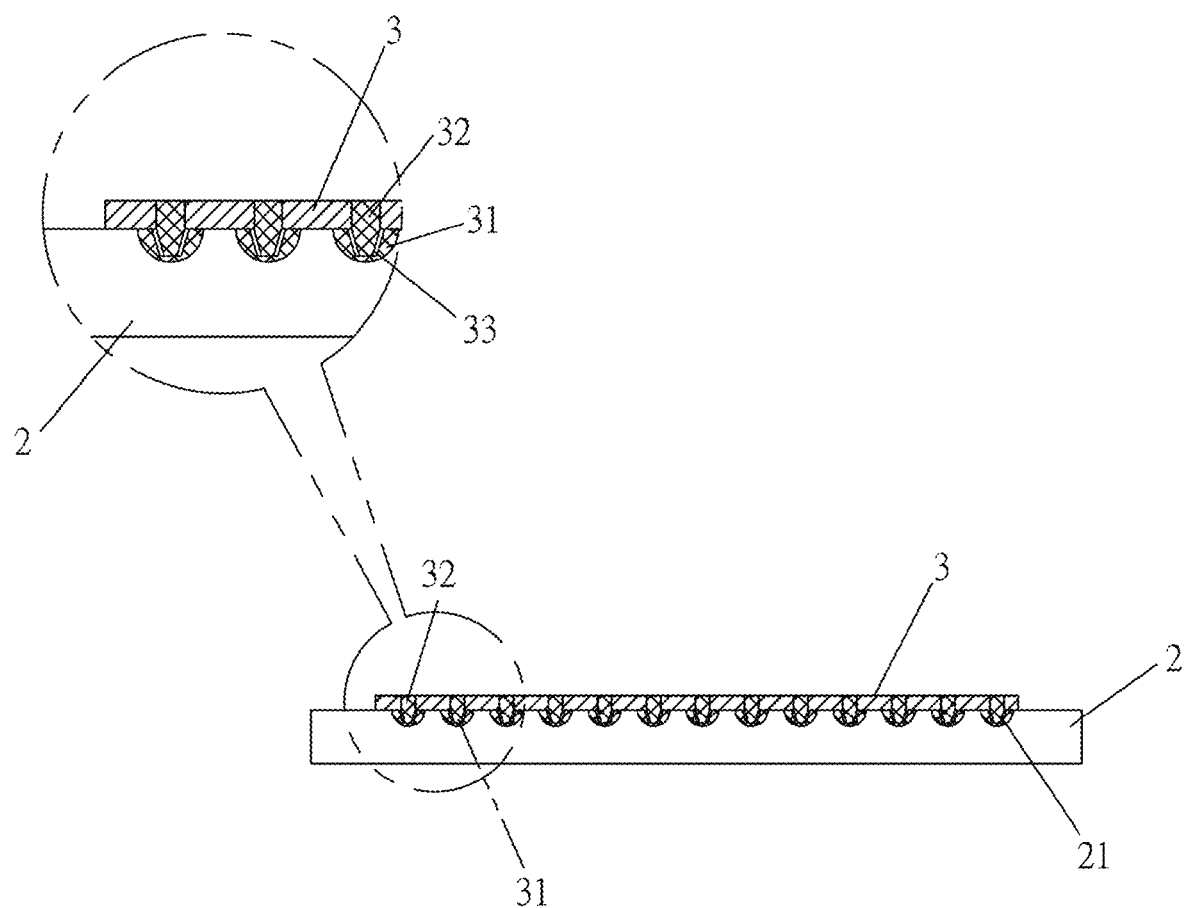
FIG. 6 is a schematic view showing the deck provided with the tapered posts.

Referring to FIG. 6, the present invention further provides a structure for enhancing the massage effect. The deck 3 is provided with a plurality of tapered posts 33. The tapered posts 33 each have a central perforation 32. Through the perforations 32 of the tapered posts 33, the wear-resistant material 1 is injected into the cavities 21 of the mold 2 to wrap the tapered posts 32 to form the plurality of massage protrusions 31. The massage protrusions 31 are hollow, thereby reducing the use of the expensive wear-resistant material 1 to lower the manufacturing cost.

Furthermore, the massage protrusions 31 on the massage wear-resistant treadmill deck can be formed with a three-dimensional pattern corresponding in shape to the cavities 21 of the mold 2.

A massage wear-resistant treadmill deck comprises a mold 2 having a plurality of cavities 21 at a bottom thereof; a wear-resistant material 1 injected into the cavities 21 at the bottom of the mold 2; and a deck 3 attached to the cavities 21 at the bottom of the mold 2.

The wear-resistant material 1 in the plurality of cavities 21 at the bottom of the mold 2 is bonded to the surface of the deck 3 to form a wear-resistant layer so that the surface of the deck 3 is formed with the massage protrusions 31 to form the massage wear-resistant treadmill deck.

In conclusion, the present invention provides a massage wear-resistant treadmill deck. Through the mold 2, the surface of the deck 3 is formed with the massage protrusions 31 to provide a better massage effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for manufacturing a massage wear-resistant treadmill deck, comprising the following steps:

step 1: providing a mold, the mold having a plurality of cavities thereon, a wear-resistant material being injected into the plurality of cavities of the mold;

step 2: placing a deck in the mold so that the wear-resistant material is bonded to a surface of the deck to form a plurality of massage protrusions on the deck; and step 3: demoulding the deck from the mold, the surface of the deck being formed with the plurality of massage protrusions to form the massage wear-resistant treadmill deck, wherein the deck is formed with a plurality of perforations, the plurality of perforations correspond in position to the plurality of cavities of the mold, and the wear-resistant material is injected into the plurality of cavities of the mold through the plurality of perforations to form the plurality of massage protrusions on the deck.

2. The method as claimed in claim 1, further comprising a sulfurization process or a natural cooling process after step 2.

3. The method as claimed in claim 1, wherein the plurality of massage protrusions on the deck are formed with a three-dimensional pattern corresponding in shape to the plurality of cavities of the mold.

4. A method for manufacturing a massage wear-resistant treadmill deck, comprising the following steps:

step 1: providing a mold, the mold having a plurality of cavities thereon, a wear-resistant material being injected into the plurality of cavities of the mold;

step 2: placing a deck in the mold so that the wear-resistant material is bonded to a surface of the deck to form a plurality of massage protrusions on the deck; and step 3: demoulding the deck from the mold, the surface of the deck being formed with the plurality of massage protrusions to form the massage wear-resistant treadmill deck, wherein the deck is provided with a plurality of tapered posts, the plurality of tapered posts each have a central perforation, through the central perforations of the plurality of tapered posts, the wear-resistant material is injected into the plurality of cavities of the mold to wrap the plurality of tapered posts.

5. The method as claimed in claim 4, further comprising a sulfurization process or a natural cooling process after step 2.

6. The method as claimed in claim 4, wherein the plurality of massage protrusions on the deck are formed with a three-dimensional pattern corresponding in shape to the plurality of cavities of the mold.

7. A massage wear-resistant treadmill deck, comprising:
a mold, having a plurality of cavities at a bottom thereof;
a wear-resistant material injected into the plurality of cavities at the bottom of the mold to form massage protrusions of a wear-resistant layer;
a deck attached to the plurality of cavities at the bottom of the mold;
wherein the wear-resistant material in the plurality of cavities at the bottom of the mold is bonded to a surface of the deck to form the wear-resistant layer so that the surface of the deck is formed with the massage protrusions to form the massage wear-resistant treadmill deck,
wherein the deck is formed with a plurality of perforations, the plurality of perforations correspond in position to the plurality of cavities of the mold, and the wear-resistant material is injected into the plurality of cavities of the mold through the plurality of perforations to form the massage protrusions on the deck.

8. The massage wear-resistant treadmill deck as claimed in claim 7, wherein the massage protrusions on the deck are formed with a three-dimensional pattern corresponding in shape to the plurality of cavities at the bottom of the mold.

9. A massage wear-resistant treadmill deck, comprising:
a mold, having a plurality of cavities at a bottom thereof;
a wear-resistant material injected into the plurality of cavities at the bottom of the mold to form massage protrusions of a wear-resistant layer;
a deck attached to the plurality of cavities at the bottom of the mold;
wherein the wear-resistant material in the plurality of cavities at the bottom of the mold is bonded to a surface of the deck to form the wear-resistant layer so that the surface of the deck is formed with the massage protrusions to form the massage wear-resistant treadmill deck,
wherein the deck is provided with a plurality of tapered posts, the plurality of tapered posts each have a central perforation, through the central perforations of the plurality of tapered posts, the wear-resistant material is injected into the plurality of cavities of the mold to wrap the plurality of tapered posts.

10. The massage wear-resistant treadmill deck as claimed in claim 9, wherein the massage protrusions on the deck are formed with a three-dimensional pattern corresponding in shape to the plurality of cavities at the bottom of the mold.

* * * * *